US012693703B2

(12) United States Patent
Wang

(10) Patent No.: US 12,693,703 B2
(45) Date of Patent: Jul. 28, 2026

(54) ROTATABLE-SCREEN SPLITTER

(71) Applicant: Lifan Lu, Shenzhen (CN)

(72) Inventor: Xiaogang Wang, Shenzhen (CN)

(73) Assignee: Lifan Lu, Shenzhen (CN)

( * ) Notice: Subject to any disclaimer, the term of this patent is extended or adjusted under 35 U.S.C. 154(b) by 0 days.

(21) Appl. No.: 19/284,990

(22) Filed: Jul. 30, 2025

(65) Prior Publication Data

US 2025/0355463 A1    Nov. 20, 2025

Related U.S. Application Data

(63) Continuation of application No. PCT/CN2024/082091, filed on Mar. 18, 2024.

(30) Foreign Application Priority Data

Jan. 22, 2024    (CN) .......................... 202420152803.8

(51) Int. Cl.
G06F 1/16        (2006.01)
F16M 11/20      (2006.01)
(52) U.S. Cl.
CPC ....... G06F 1/1618 (2013.01); F16M 11/2021 (2013.01)
(58) Field of Classification Search
CPC ............................ F16M 13/022; G06F 1/1618
See application file for complete search history.

(56) References Cited

U.S. PATENT DOCUMENTS

| | | | | |
|---|---|---|---|---|
| 5,768,096 | A * | 6/1998 | Williams | G06F 1/1616 |
| | | | | 361/679.04 |
| 6,532,146 | B1 * | 3/2003 | Duquette | G06F 1/1607 |
| | | | | 361/679.04 |
| 9,395,757 | B2 * | 7/2016 | Relf | G06F 1/1607 |
| 9,441,782 | B2 * | 9/2016 | Funk | F16M 13/00 |
| 10,168,739 | B1 * | 1/2019 | Chen | G06F 1/1616 |
| 10,817,020 | B1 * | 10/2020 | DeMaio | G06F 3/1423 |
| 11,122,702 | B1 * | 9/2021 | Lin | H05K 5/30 |
| 11,416,024 | B2 * | 8/2022 | Bryant | G06F 1/1632 |
| 11,487,328 | B1 * | 11/2022 | Gu | G06F 1/1683 |
| 11,543,858 | B2 * | 1/2023 | Chen | G06F 1/1647 |
| 11,573,596 | B2 * | 2/2023 | Levine | G06F 1/1637 |
| 11,627,675 | B2 * | 4/2023 | Eisenberg | G06F 1/1632 |
| | | | | 361/807 |
| 11,815,953 | B2 * | 11/2023 | Yao | G06F 1/1649 |
| 11,899,497 | B1 * | 2/2024 | Levine | G06F 1/1632 |
| 11,953,942 | B2 * | 4/2024 | Sun | G06F 1/1616 |
| 12,259,749 | B2 * | 3/2025 | Ye | G06F 1/1607 |
| 12,455,597 | B2 * | 10/2025 | Kim | G06F 1/1616 |

(Continued)

*Primary Examiner* — Monica E Millner

(57)        ABSTRACT

A rotatable-screen splitter includes a display screen, a connecting portion, a cross arm and a mainboard. The display screen is connected to the connecting portion, the connecting portion is connected to the cross arm, and the cross arm is connected to the mainboard. The connecting portion includes a fastening piece and a rotating block, and the fastening piece is connected to the rotating block. By implementing the above technical solution, the disclosure has the following technical effects: screens may be freely switched to a horizontal state or a vertical state, the switching process is simple, assembly and disassembly are convenient, the screens are unlikely to be damaged, the performance is reliable, and the experience is good.

16 Claims, 8 Drawing Sheets

(56)        References Cited

U.S. PATENT DOCUMENTS

| | | | |
|---|---|---|---|
| 2003/0043087 A1* | 3/2003 | Kim | G06F 1/1641 |
| | | | 345/1.1 |
| 2007/0084978 A1* | 4/2007 | Martin | F16M 11/2064 |
| | | | 248/176.1 |
| 2009/0090825 A1* | 4/2009 | Jung | G06F 1/1601 |
| | | | 16/221 |
| 2009/0122474 A1* | 5/2009 | Mickey | F16M 11/126 |
| | | | 361/679.04 |
| 2010/0124006 A1* | 5/2010 | Chang | G06F 1/1624 |
| | | | 361/679.04 |
| 2011/0298690 A1* | 12/2011 | Reilly | G06F 1/1649 |
| | | | 345/1.1 |
| 2012/0047785 A1* | 3/2012 | Swick | A47G 1/065 |
| | | | 40/729 |
| 2017/0123456 A1* | 5/2017 | Chung | G06F 1/203 |
| 2020/0278722 A1* | 9/2020 | Hudgins | G06F 1/1654 |
| 2020/0301481 A1* | 9/2020 | Robinson | H04M 1/04 |
| 2021/0134130 A1* | 5/2021 | Kiani | A61B 5/1455 |
| 2021/0405702 A1* | 12/2021 | Hudgins | G06F 1/1622 |
| 2022/0075417 A1* | 3/2022 | Gu | G06F 1/1681 |
| 2022/0129038 A1* | 4/2022 | Chen | G06F 1/1601 |
| 2022/0253101 A1* | 8/2022 | Atias | F16M 11/14 |
| 2024/0061470 A1* | 2/2024 | Kim | G06F 1/1616 |
| 2024/0241537 A1* | 7/2024 | Wang | G06F 1/1624 |
| 2024/0288901 A1* | 8/2024 | Gu | G06F 1/1656 |
| 2024/0324119 A1* | 9/2024 | Ma | G06F 1/1607 |
| 2025/0036161 A1* | 1/2025 | Hao | F16M 11/041 |

* cited by examiner

ROTATABLE-SCREEN SPLITTER

CROSS REFERENCE TO RELATED DISCLOSURES

The present application is a continuation-application of International (PCT) Patent Application No. PCT/CN2024/082091 filed on Mar. 18, 2024, which claims priority benefits to Chinese Patent Disclosure No. 202420152803.8, filed on Jan. 22, 2024, the contents of which are incorporated herein by reference.

BACKGROUND OF THE INVENTION

Technical Field

The disclosure relates to the technical field of rotatable-screen splitters, in particular to a rotatable-screen splitter.

Description of Related Art

At present, most double-screen splitters on the market can only realize display at a fixed angle and cannot realize free switching of screens between a horizontal state and a vertical state. In actual use, the switching process is complex, assembly and disassembly are inconvenient, screens are easily damaged, and experience is poor. The disclosure particularly provides a rotatable-screen splitter, which is easy to assemble, reliable in performance and good in experience.

BRIEF SUMMARY OF THE INVENTION

The objective of the disclosure is to provide a rotatable-screen splitter to solve the problems in the prior art.

To fulfill the above objective, the disclosure provides the following technical solution:

A rotatable-screen splitter includes a display screen 1, a connecting portion 2, a cross arm 3 and a mainboard 4; the display screen 1 is connected to the connecting portion 2, the connecting portion 2 is connected to the cross arm 3, and the cross arm 3 is connected to the mainboard 4;

the connecting portion 2 includes a fastening piece 5 and a rotating block 6, and the fastening piece 5 is connected to the rotating block 6;

the fastening piece 5 is movably clamped on the display screen 1, one end of the rotating block 6 is fixedly connected to the cross arm 3 or the fastening piece 5, and the other end of the rotating block 6 is rotatably connected to the fastening piece 5 or the cross arm 3; or, the fastening piece 5 is movably clamped on the cross arm 3, one end of the rotating block 6 is fixedly connected to the display screen 1 or the fastening piece 5, and the other end of the rotating block 6 is rotatably connected to the fastening piece 5 or the display screen 1.

Preferably, a sliding groove 7 is formed in the display screen 1, an elastic block 8 is arranged in the sliding groove 7, a first groove 9 is formed in the fastening piece 5, the fastening piece 5 is slidable in the sliding groove 7, and the elastic block 8 is elastically clamped in the first groove 9;

one end of the rotating block 6 s fixedly connected to the fastening piece 5, and the other end of the rotating block 6 is rotatably connected to the cross arm 3;

the cross arm is rotatably connected to the main board 4.

Preferably, the mainboard 4 includes a first connecting plate 10, a second connecting plate 11 and an elastic damping device;

sliders 12 are arranged on the first connecting plate 10, slideways 13 are arranged on the second connecting plate 11, and the sliders 12 are movably clamped in the slideways 13;

the elastic damping device includes first springs 14 and damping blocks 15, the damping blocks 15 are fixedly connected to ends of the first springs 14 and slidably connected to the sliders 12;

the number of the slideways 13 is at least two, first holes 16 are formed in the slideways 13, and the first springs 14 are arranged in the first holes 16;

a damping piece 17 is fixedly arranged on side walls of the slideways 13, and the damping piece 17 is slidably connected to the sliders 12.

Preferably, the mainboard 4 includes a support plate 18, a second groove 19 is formed in a back side, corresponding to the support plate 18, of the mainboard 4, and the support plate 18 is rotatably fixed in the second groove 19.

Preferably, a first magnetic substance 20 is arranged on the rotating block 6 or the support plate 18, and a third magnetic substance 24 is arranged in a third groove 23 or on a protrusion 21.

Preferably, at least two display screens 1 are arranged, protrusions 21 are arranged on back sides of the display screens 1, second magnetic substances 22 are arranged on front sides of the display screens 1, and the second magnetic substances 22 at corresponding positions of the display screens 1 have opposite magnetic polarities or have only one magnetic polarity;

third grooves 23 are formed in a front side of the mainboard 4, and the protrusions 21 are movably clamped in the third grooves 23.

Preferably, a speaker, a three-way toggle switch and three TYPE-C interfaces are arranged on the display screen 1.

Preferably, a first limiting block 25 is arranged on the rotating block 6, the rotating block 6 is clamped on the first limiting block 25, and the first limiting block 25 is fixedly connected to the cross arm 3.

Preferably, at least one second hole 26 is formed in the sliding groove 7, and the elastic block 8 includes a second spring and a second limiting block 27;

one end of the second spring is fixedly connected to a bottom of the second hole 26, the other end of the second spring is fixedly connected to one end of the second limiting block 27, and the other end of the second limiting block 27 is elastically arranged at a top of the second hole 26.

Preferably, the cross arm 3 includes a first connecting arm 28 and a second connecting arm 29; the connecting portion 2 is connected to the first connecting arm 28, the first connecting arm 28 is movably connected to the second connecting arm 29, and the second connecting arm 29 is connected to the mainboard 4; at least one fourth groove 30 is formed in the first connecting arm 28.

By implementing the above technical solution, the disclosure has the following technical effects: the screens may be freely switched to a horizontal state or a vertical state, the switching process is simple, assembly and disassembly are convenient, the screens are unlikely to be damaged, the performance is reliable, and the experience is good.

DETAILED DESCRIPTION OF THE INVENTION

To gain a better understanding of the technical solutions of the disclosure, the embodiments of the disclosure are described in detail below in conjunction with accompanying drawings.

Figure 1:
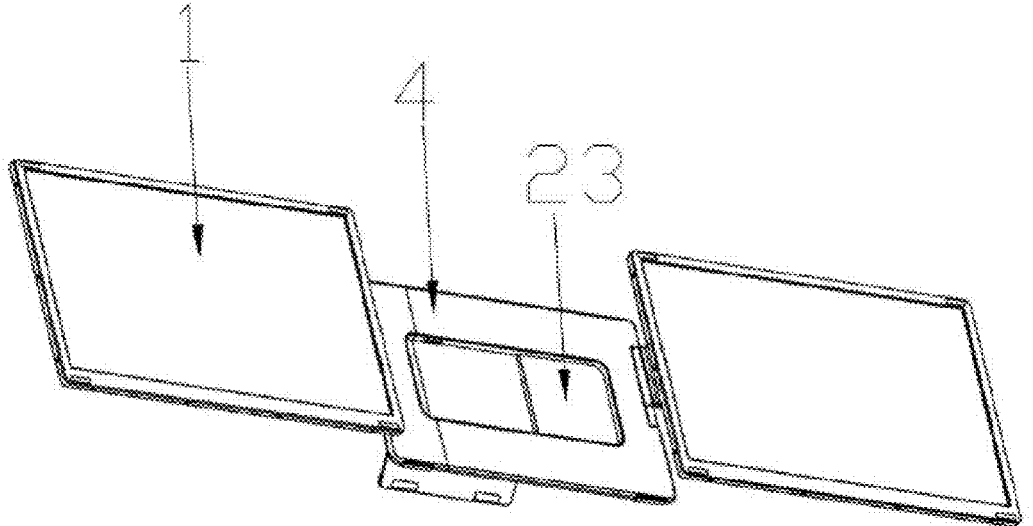
FIG. 1 is a schematic overall structural diagram (stereogram) of a rotatable-screen splitter according to the disclosure.
Figure 2:
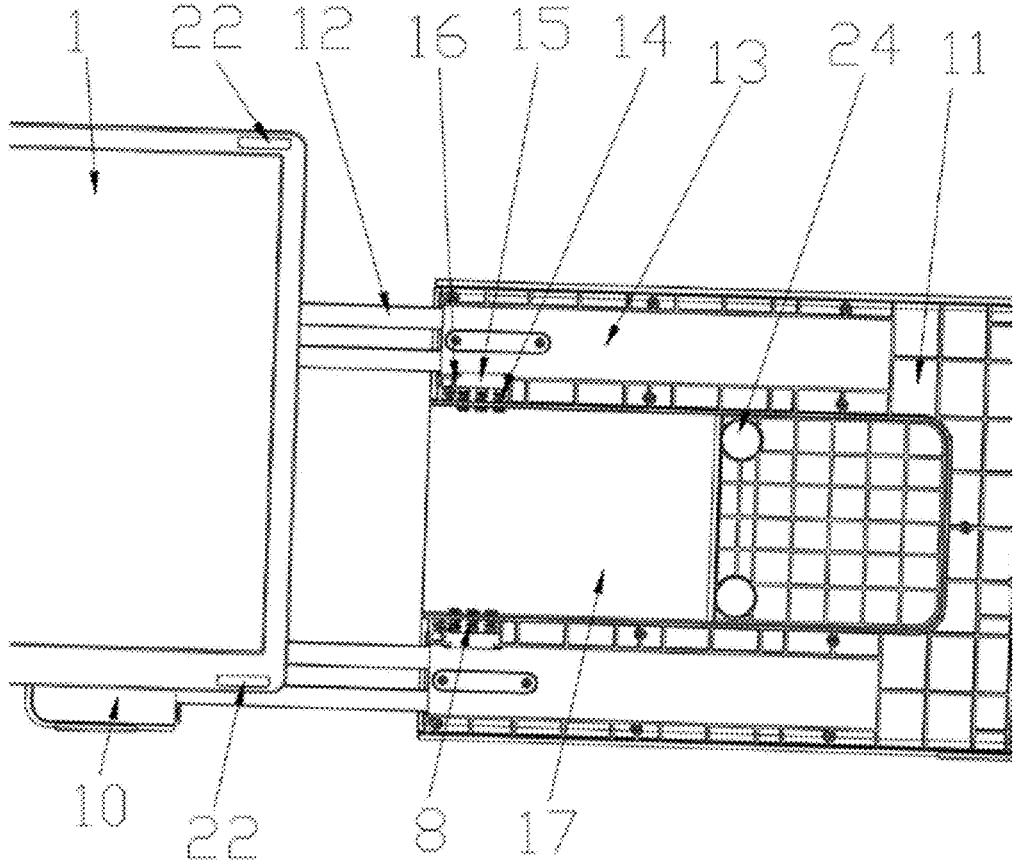
FIG. 2 is a schematic partial structural diagram (sectional view) of the rotatable-screen splitter according to the disclosure.
Figure 3:
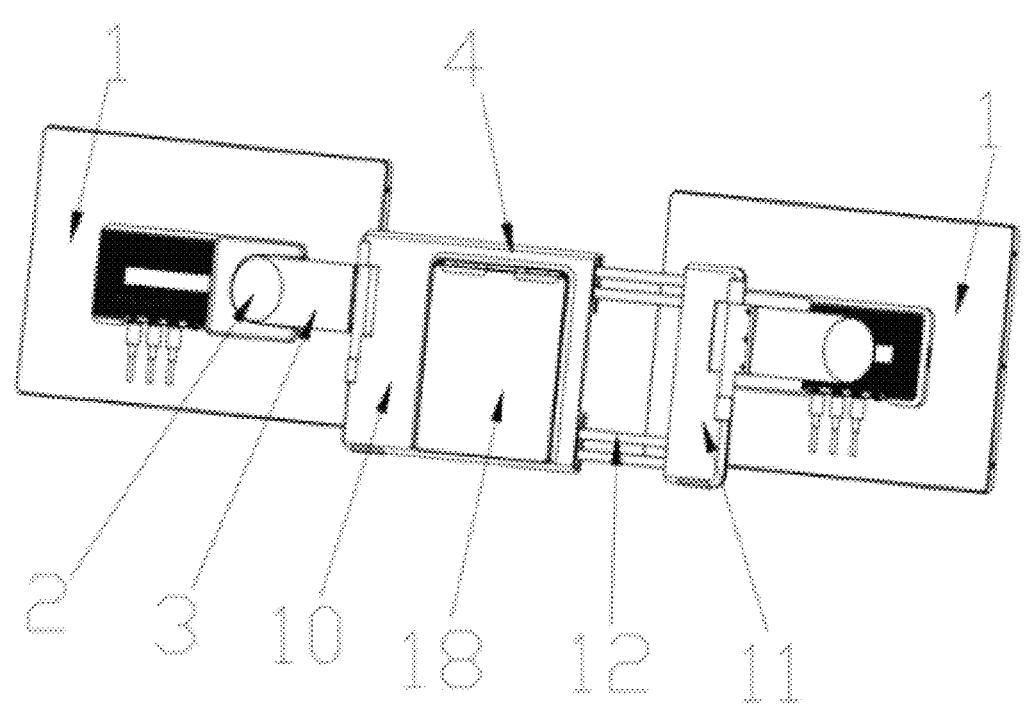
FIG. 3 is a schematic overall structural diagram (stereogram) of the rotatable-screen splitter according to the disclosure.
Figure 4:
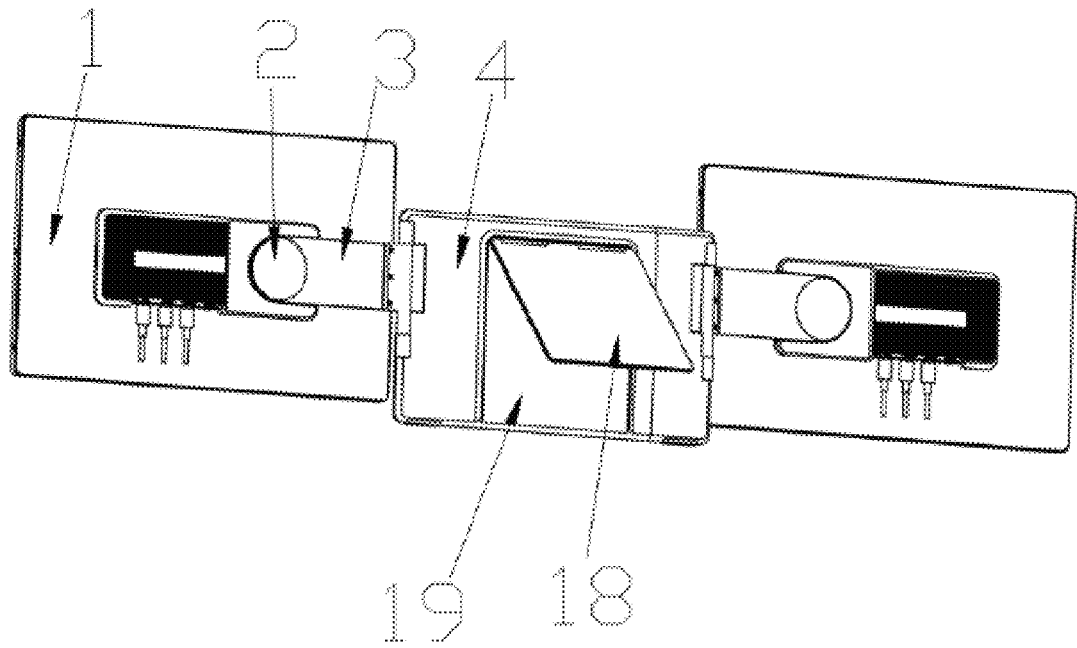
FIG. 4 is a schematic overall structural diagram (stereogram) of the rotatable-screen splitter according to the disclosure.
Figure 5:
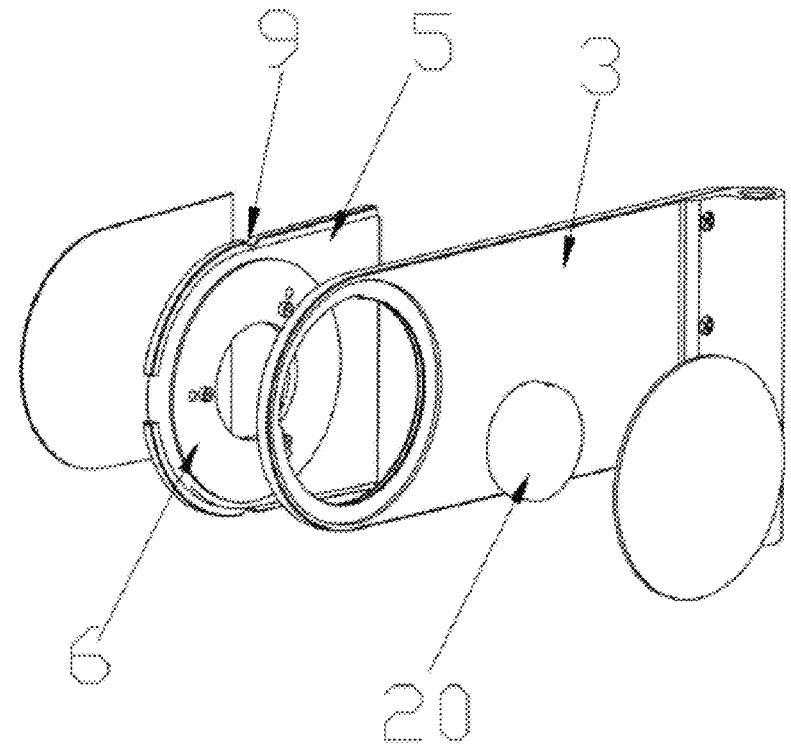
FIG. 5 is a schematic partial structural diagram (sectional view) of the rotatable-screen splitter according to the disclosure.
Figure 6:
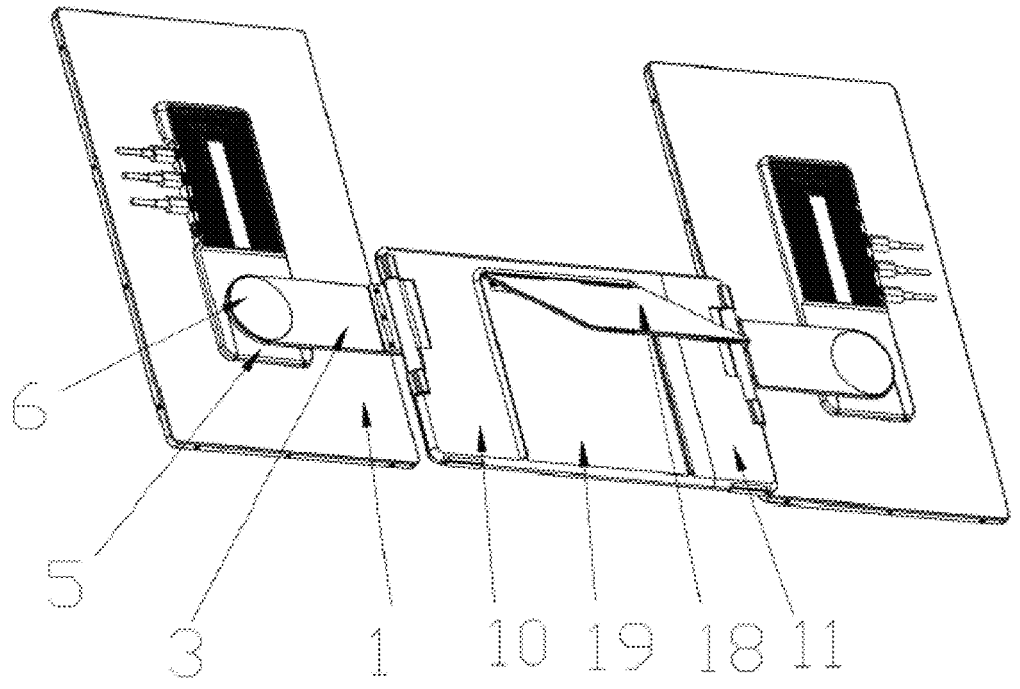
FIG. 6 is a schematic overall structural diagram (stereogram) of the rotatable-screen splitter according to the disclosure.
Figure 7:
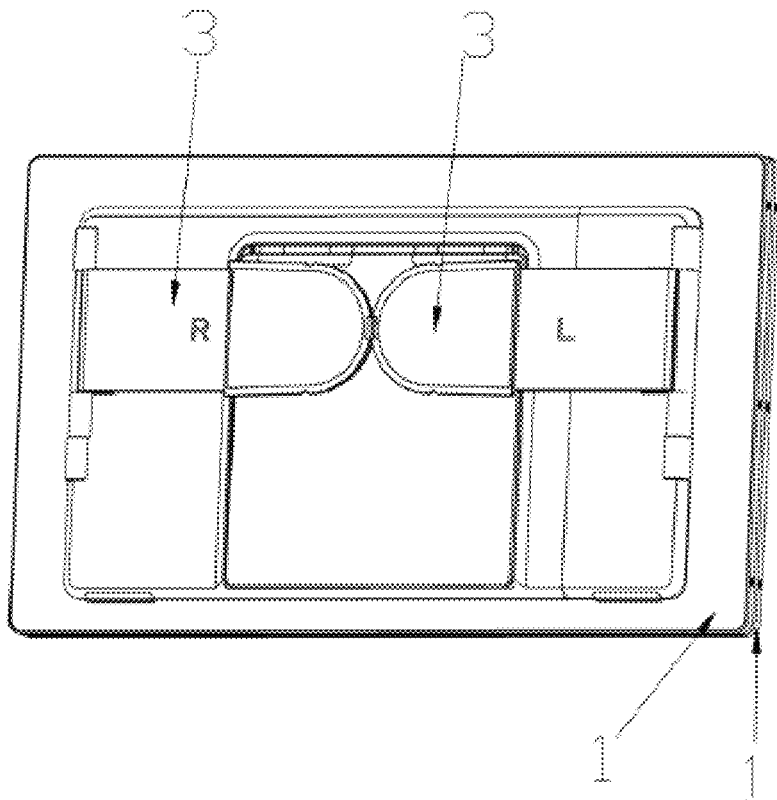
FIG. 7 is a schematic overall structural diagram (stereogram) of the rotatable-screen splitter according to the disclosure.
Figure 8:
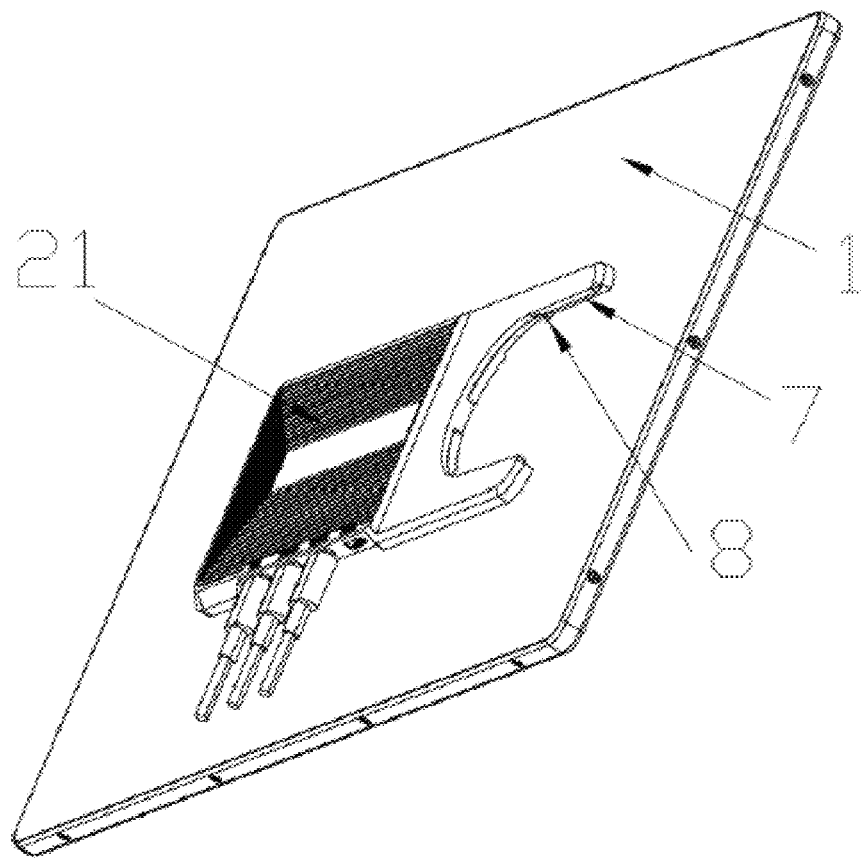
FIG. 8 is a schematic partial structural diagram (sectional view) of the rotatable-screen splitter according to the disclosure.
Figure 9:
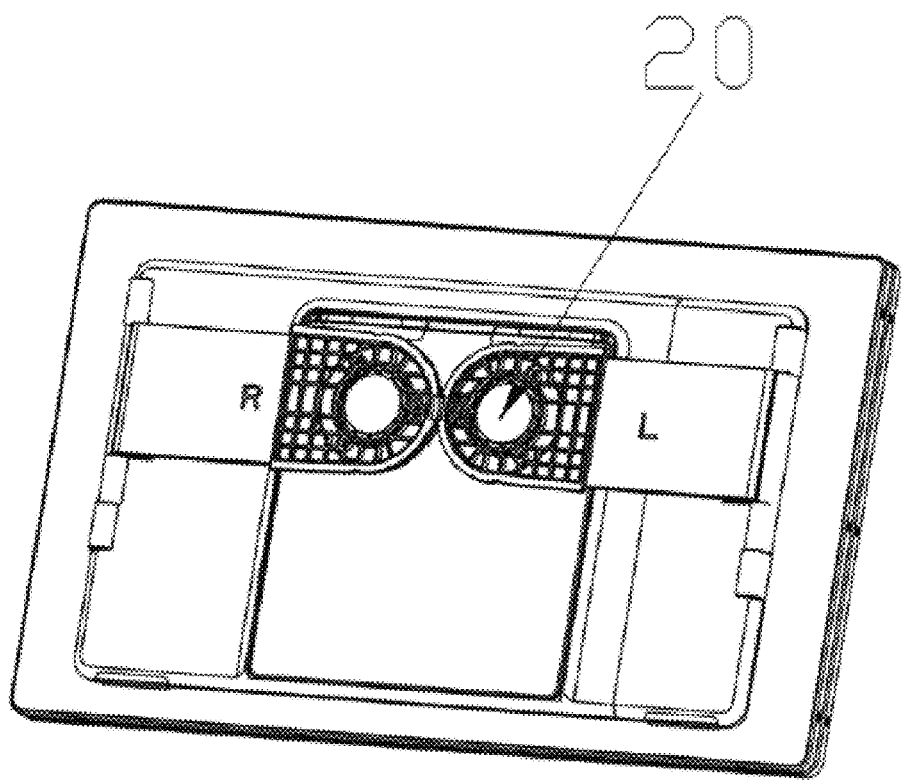
FIG. 9 is a schematic partial structural diagram (sectional view) of the rotatable-screen splitter according to the disclosure.
Figure 10:
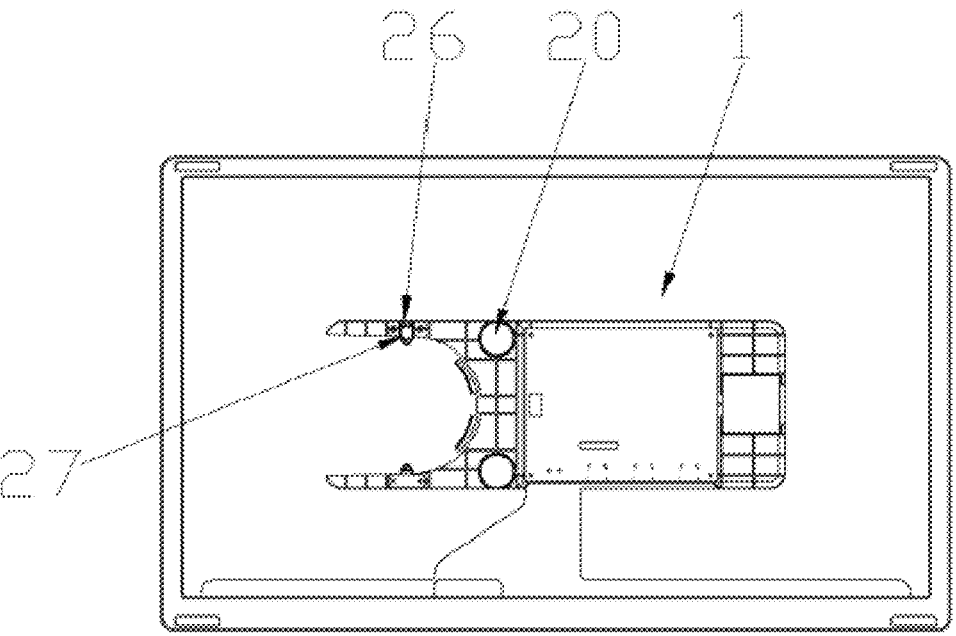
FIG. 10 is a schematic partial structural diagram (sectional view) of the rotatable-screen splitter according to the disclosure.
Figure 11:
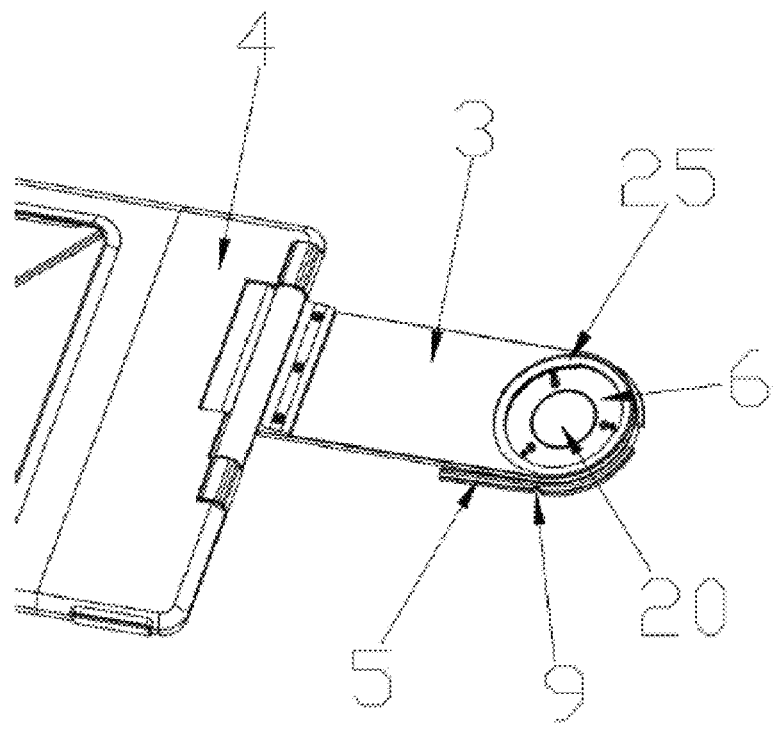
FIG. 11 is a schematic partial structural diagram (sectional view) of the rotatable-screen splitter according to the disclosure.
Figure 12:
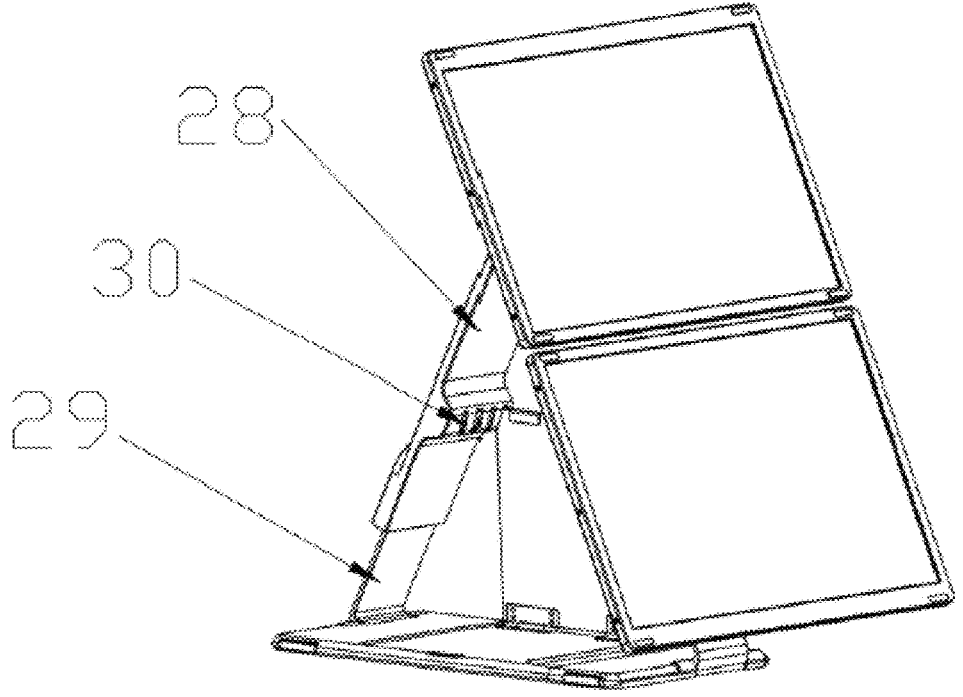
FIG. 12 is a schematic overall structural diagram (stereogram) of the rotatable-screen splitter according to the disclosure.
Figure 13:
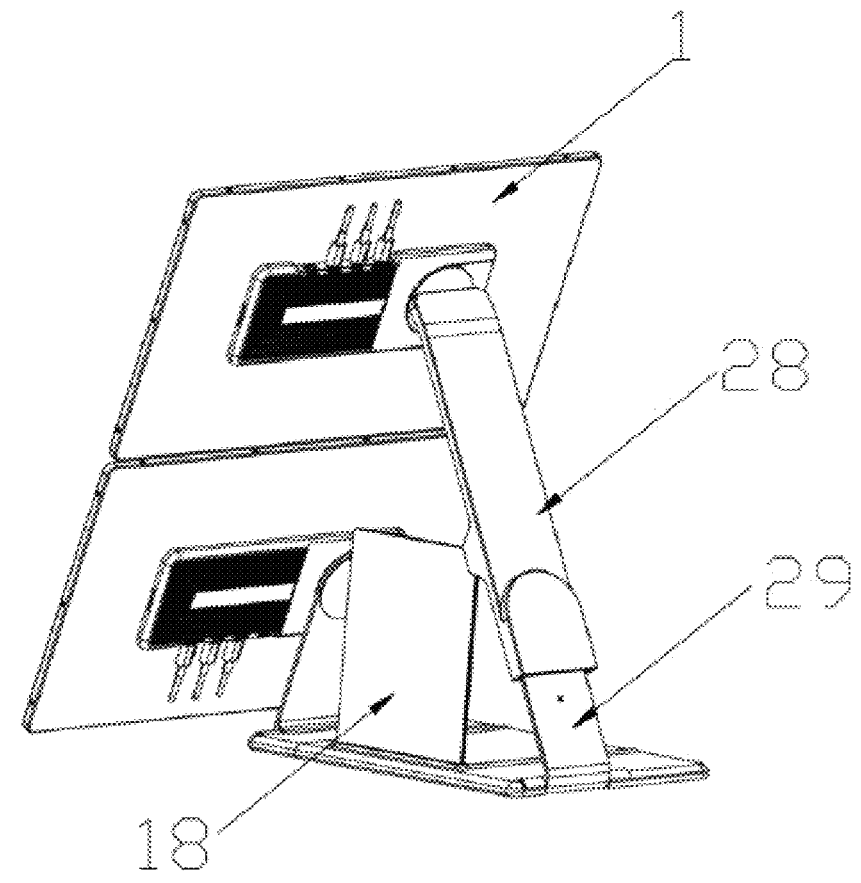
FIG. 13 is a schematic overall structural diagram (stereogram) of the rotatable-screen splitter according to the disclosure.

As shown in FIGS. 1-13, it may be understood that this embodiment provides a rotatable-screen splitter, including a display screen 1, a connecting portion 2, a cross arm 3 and a mainboard 4. The display screen 1 is connected to the connecting portion 2, the connecting portion 2 is connected to the cross arm 3, and the cross arm 3 is connected to the mainboard 3. The connecting portion 2 includes a fastening piece 5 and a rotating block 6, and the fastening piece 5 is connected to the rotating block 6. The fastening piece 5 is movably clamped on the display screen 1, one end of the rotating block 6 is fixedly connected to the cross arm 3 or the fastening piece 5, and the other end of the rotating block 6 is rotatably connected to the fastening piece 5 or the cross arm 3. Or, the fastening piece 5 is movably clamped on the cross arm 3, one end of the rotating block 6 is fixedly connected to the display screen 1 or the fastening piece 5, and the other end of the rotating block 6 is rotatably connected to the fastening piece 5 or the display screen 1.

In this embodiment, the connecting portion 2 is a key component for realizing rotation of the screen, and the fastening piece 5 is clamped on the cross arm 3 or the display screen 1 to realize a movable connection. Wherein, a snap-fit function may be realized by means of a first wave spring, a first compression spring or any other structures capable of realizing the snap-fit function to ensure that the screen may be stored quickly and conveniently.

Specifically, the rotating block 6 fulfills the rotation function specifically in the following four ways:

First, the fastening piece 5 is movably clamped on the display screen 1, one end of the rotating block 6 is fixedly connected to the cross arm 3, and the other end of the rotating block 6 is rotatably connected to the fastening piece 5.

Second, the fastening piece 5 is movably clamped on the display screen 1, one end of the rotating block 6 is fixedly connected to the fastening piece 5, and the other end of the rotating block 6 is rotatably connected to the cross arm 3.

Third, the fastening piece 5 is movably clamped on the cross arm 3, one end of the rotating block 6 is fixedly connected to the display screen 1, and the other end of the rotating block 6 is rotatably connected to the fastening piece 5.

Fourth, the fastening piece 5 is movably clamped on the cross arm 3, one end of the rotating block 6 is fixedly connected to the fastening piece 5, and the other end of the rotating block 6 is rotatably connected to the display screen 1.

In a second embodiment, a sliding groove 7 is formed in the display screen 1, an elastic block 8 is arranged in the sliding groove 7, a first groove 9 is formed in the fastening piece 5, the fastening piece 5 is slidable in the sliding groove 7, and the elastic block 8 is elastically clamped in the first groove 9. This is a specific connection method for connecting the connecting portion 2 with other structures, such that the cross arm 3, the connecting portion 2 and the display screen 1 may be disassembled freely; and a clearance-fit damper and a first wave spring are used to provide a damping effect and a good hand feeling in use. One end of the rotating block 6 is fixedly connected to the fastening piece 5, the other end of the rotating block 6 is rotatably connected to the cross arm 3, and left and right cross arms 3 are connected to left and right connecting portions 2 by means of rotating shafts, such that the angle of the left and right connecting portions 2 may be adjusted freely, and a damping effect is realized. The cross arms are rotatably connected to the mainboard 4, such that the angle of the left and right cross arms 3 may be adjusted freely, and a damping effect is realized, thus improving the usage experience of users.

In the second embodiment, when the fastening piece 5 is clamped in the sliding groove 7, a second limiting block 27 is pressed downwards; when the first groove 9 in the fastening piece 5 moves to the elastic block 8, and the second limiting block 27 bounces upwards and clamps the fastening piece 5 to realize a stable connection, thus guaranteeing the ease of use for users. This is a method for realizing the elastic snap-fit function of the elastic block 8, and any other structures capable of realizing the elastic snap-fit function such as a wave spring and a compression spring should also fall within the protection scope of the patent.

Based on the above embodiments, further, the mainboard 4 includes a first connecting plate 10, a second connecting plate 11 and an elastic damping device. Sliders 12 are arranged on the first connecting plate 10, slideways 13 are arranged on the second connecting plate 11, and the sliders 12 are movably clamped in the slideways 13. The slideways 13 and the sliders 12 are specific structures for realize a slidable connection between the first connecting plate 10 and the second connecting plate 11. By means of the slideways 13 and the sliders 12 clamped in the slideways 13, the first connecting plate 10 and the second connecting plate 11 may move stably when pulled, thus improving the hand feeling in use. When the splitter is used, that is, when the first connecting plate 10 and the second connecting plate 11 are not pulled, the first connecting plate 10 and the second connecting plate 11 are kept stable relatively, the hand feeling in the pulling process is improved while the pulling stability of the splitter is guaranteed, the ease of installation is improved, and usage experience is improved.

The elastic damping device includes first springs 14 and damping blocks 15. The damping blocks 15 are fixedly connected to ends of the first springs 14 and slidably connected to the sliders 12. The resistance between the damping blocks 15 and the sliders 12 is adjusted by controlling the degree of compression of the first springs 14, the resistance of the two damping blocks 15 may be adjusted separately to realize stable movements of the first connecting plate 10 and the second connecting plate 11 to improve the hand feeling in use, and the resistance of each damping block 15 may be accurately adjusted.

The number of the slideways 13 is at least two, first holes 16 are formed in the slideways 13, and the first springs 14 are arranged in the first holes 16, such that multiple screens may be used at the same time in use of the splitter, thus improving usage experience; and the splitter, when not used, may be stored, thus increasing space utilization.

A damping piece 17 is fixedly arranged on side walls of the slideways 13 and slidably connected to the sliders 12. When the first connecting plate 10 and the second connecting plate 11 are further pulled, the first connecting plate 10 and the second connecting plate 11 may move stably, thus improving the hand feeling in use. When the splitter is used, that is, when the first connecting plate 10 and the second connecting plate 11 are not pulled, the first connecting plate 10 and the second connecting plate 11 are kept stable relatively, such that the hand feeling in the pulling process is improved while the pulling stability of the splitter is guaranteed, the ease of installation is improved, and usage experience is improved.

Based on the above embodiments, further, the mainboard 4 includes a support plate 18, a second groove 19 is formed in a back side, corresponding to the support plate 18, of the mainboard 4, and the support plate 18 is rotatably fixed in the second groove 19. By adopting the support plate 18, the splitter may be adjusted to multiple angles, is easy to store and satisfies the requirements for viewing angles in different application scansions; meanwhile, the counterweight structure of a support is optimized, the splitter may be directly and stably placed on a desk at a suitable viewing angle and will not fall; and the novel structure improves the aesthetics and practicability of the splitter and solves the problems that the support easily falls in use, pulling is unsmooth, a jam occurs and a computer screen is easily damaged.

Based on the above embodiments, further, a first magnetic substance 20 is arranged on the rotating block 6 or the support plate 18, or magnetic substances are arranged both on the rotating block 6 and on the support plate 18. When the splitter is stored, an attractive force may be generated between the support plate 18 and the first magnetic substance 20, or between the rotating block 6 and the first magnetic substance 20, or between the support plate 18 and the rotating block 6 to ensure that the splitter is stable and will not fall apart in the storage state, thus improving the usage experience of users. A third magnetic substance 24 is arranged in a third groove 23 or on a protrusion 21, such that the support of the splitter allows for storage of the screen;

and an attractive force may be generated between the third magnetic substance 24 in the third groove 23 and a magnet on the display screen to ensure that the splitter will not fall apart after being stored, thus reducing the storage size of the splitter and facilitating the use of the splitter.

Based on the above embodiments, further, at least two display screens 1 are arranged, protrusions 21 are arranged on back sides of the display screens 1, second magnetic substances 22 are arranged on front sides of the display screens 1, and the second magnetic substances 22 at corresponding positions of the display screens 1 have opposite magnetic polarities or have only one magnetic polarity. The two display screens 1 may be stored face to face after being detached and are attracted together by means of a magnet, such that the storage size is reduced, and use is facilitated. Third grooves 23 are formed in a front side of the mainboard 4, and the protrusions 21 are movably clamped in the third grooves 23 to facilitate storage and use, thus further improving the storage effect.

Based on the above embodiments, further, a speaker, a three-way toggle switch and three TYPE-C interfaces are arranged on the display screen 1, such that the compatibility of the splitter is improved while extra requirements of customers are satisfied.

Based on the above embodiments, further, a first limiting block 25 is arranged on the rotating block 6, the rotating block 6 is clamped on the first limiting block 25, and the first limiting block 25 may be fixedly connected to the cross arm 3 by screw fixation. A rotatable limiting device is formed by the rotating block 6, the first limiting block 25 and the cross arm 3 to allow the display screen 1 to rotate by 90° to be in a vertical state and kept stable, thus guaranteeing the structural strength of the splitter while the functions of the splitter are guaranteed, and improving usage experience. In addition, the first limiting block 25 may be made from silicon steel to improve the abrasion resistance and the hand feeling in rotation.

Based on the above embodiments, further, at least one second hole 26 is formed in the sliding groove 7, and the elastic block 8 includes a second spring and a second limiting block 27; and one end of the second spring is fixedly connected to the bottom of the second hole 26, the other end of the second spring is fixedly connected to one end of the second limiting block 27, and the other end of the second limiting block 27 is elastically arranged at the top of the second hole 26. This is another specific structure for realizing an elastic snap-fit function of the elastic block 8: when the fastening piece 5 is clamped in the sliding groove 7, the second limiting block 27 is pressed downwards; and when the first groove 9 in the fastening piece 5 moves to the elastic block 8, the second limiting block 27 controlled by the second spring bounce upwards and clamps the fastening piece 5 to realize a stable connection, thus guaranteeing the ease of use for users. Based on the above embodiment, further, the cross arm 3 includes a first connecting arm 28 and a second connecting arm 29; the connecting portion 2 is connected to the first connecting arm 28, the first connecting arm 28 is movably connected to the second connecting arm 29, and the second connecting arm 29 is connected to the mainboard 4; and at least one fourth groove 28 is formed in the first connecting arm 28. The first connecting arm 28 is movably connected to the second connecting arm 29, such that the display screen 1 together with the first connecting arm 28 may be detached from the second connecting arm 29 or the display screen 1 and the first connecting arm 28 may be detached from the second connecting arm 29, such that the second connecting arm 29 may be stored on the mainboard 4, the display screen 1 may be stored separately, the whole rotatable-screen splitter has a smaller size when stored, and space utilization is increased. The fourth groove 30 movably works together with the support plate 18 to form a stable triangular structure to support and fix the cross arm 3 at a specific angle, such that a stable triangular structure is formed by the display screen 1, the mainboard 4 and the cross arm 3, and multiple display screens 1 may be synchronously used side-by-side, thus improving the usage experience of users. Four fourth grooves 30 are preferably formed in the first connecting arm 28 and correspondingly support the first connecting arm 28 at different angles, such that different angles of the display screen 1 are formed to be easily selected and adopted by users.

The rotatable-screen splitter provided by the embodiments of the disclosure is described in detail above. For those ordinarily skilled in the art, transformations may be made to the specific embodiments and application range of the disclosure according to the concept of the embodiments of the disclosure. Thus, the description here should not be construed as limitations of the disclosure.

What is claimed is:

1. A rotatable-screen splitter, comprising a display screen (1), a connecting portion (2), a cross arm (3) and a mainboard (4), wherein the display screen (1) is connected to the connecting portion (2), the connecting portion (2) is connected to the cross arm (3), and the cross arm (3) is connected to the mainboard (4);

the connecting portion (2) comprises a fastening piece (5) and a rotating block (6), and the fastening piece (5) is connected to the rotating block (6);

the fastening piece (5) is movably clamped on the display screen (1), one end of the rotating block (6) is fixedly connected to one of the cross arm (3) and the fastening piece (5), and the other end of the rotating block (6) is rotatably connected to the other of the cross arm (3) and the fastening piece (5);

or the fastening piece (5) is movably clamped on the cross arm (3), one end of the rotating block (6) is fixedly connected to one of the display screen (1) and the fastening piece (5), and the other end of the rotating block (6) is rotatably connected to the other of the display screen (1) and the fastening piece (5);

wherein a sliding groove (7) is formed in the display screen (1), an elastic block (8) is arranged in the sliding groove (7), a first groove (9) is formed in the fastening piece (5), the fastening piece (5) is slidable in the sliding groove (7), and the elastic block (8) is elastically clamped in the first groove (9);

one end of the rotating block (6) is fixedly connected to the fastening piece (5), and the other end of the rotating block (6) is rotatably connected to the cross arm (3);

the cross arm is rotatably connected to the main board (4).

2. The rotatable-screen splitter according to claim 1, wherein the mainboard (4) comprises a first connecting plate (10), a second connecting plate (11) and an elastic damping device;

sliders (12) are arranged on the first connecting plate (10), slideways (13) are arranged on the second connecting plate (11), and the sliders (12) are movably clamped in the slideways (13);

the elastic damping device comprises first springs (14) and damping blocks (15), the damping blocks (15) are fixedly connected to ends of the first springs (14) and slidably connected to the sliders (12);

the number of the slideways (13) is at least two, first holes (16) are formed in the slideways (13), and the first springs (14) are arranged in the first holes (16);

a damping piece (17) is fixedly arranged on side walls of the slideways (13), and the damping piece (17) is slidably connected to the sliders (12).

3. The rotatable-screen splitter according to claim 1, wherein the mainboard (4) comprises a support plate (18), a second groove (19) is formed in a back side, corresponding to the support plate (18), of the mainboard (4), and the support plate (18) is rotatably fixed in the second groove (19).

4. The rotatable-screen splitter according to claim 3, wherein a first magnetic substance (20) is arranged on the rotating block (6) or the support plate (18);

a third groove (23) is formed in a front side of the mainboard (4), and a third magnetic substance (24) is arranged in the third groove (23) or on a protrusion (21).

5. The rotatable-screen splitter according to claim 1, wherein at least two said display screens (1) are arranged, protrusions (21) are arranged on back sides of the display screens (1), second magnetic substances (22) are arranged on front sides of the display screens (1), and the second magnetic substances (22) at corresponding positions of the display screens (1) have opposite magnetic polarities or have only one magnetic polarity;

third grooves (23) are formed in a front side of the mainboard (4), and the protrusions (21) are movably clamped in the third grooves (23).

6. The rotatable-screen splitter according to claim 1, wherein a speaker, a three-way toggle switch and three TYPE-C interfaces are arranged on the display screen (1).

7. The rotatable-screen splitter according to claim 1, wherein a first limiting block (25) is arranged on the rotating block (6), the rotating block (6) is clamped on the first limiting block (25), and the first limiting block (25) is fixedly connected to the cross arm (3).

8. The rotatable-screen splitter according to claim 1, wherein at least one second hole (26) is formed in the sliding groove (7), and the elastic block (8) comprises a second spring and a second limiting block (27);

one end of the second spring is fixedly connected to a bottom of the second hole (26), the other end of the second spring is fixedly connected to one end of the second limiting block (27), and the other end of the second limiting block (27) is elastically arranged at a top of the second hole (26).

9. The rotatable-screen splitter according to claim 1, wherein the cross arm (3) comprises a first connecting arm (28) and a second connecting arm (29);

the connecting portion (2) is connected to the first connecting arm (28), the first connecting arm (28) is movably connected to the second connecting arm (29), and the second connecting arm (29) is connected to the mainboard (4);

at least one fourth groove (30) is formed in the first connecting arm (28).

10. A rotatable-screen splitter, comprising a display screen (1), a connecting portion (2), a cross arm (3) and a mainboard (4), wherein the display screen (1) is connected to the connecting portion (2), the connecting portion (2) is connected to the cross arm (3), and the cross arm (3) is connected to the mainboard (4);

the connecting portion (2) comprises a fastening piece (5) and a rotating block (6), and the fastening piece (5) is connected to the rotating block (6);

the fastening piece (5) is movably clamped on the display screen (1), one end of the rotating block (6) is fixedly connected to one of the cross arm (3) and the fastening piece (5), and the other end of the rotating block (6) is rotatably connected to the other of the cross arm (3) and the fastening piece (5);

or, the fastening piece (5) is movably clamped on the cross arm (3), one end of the rotating block (6) is fixedly connected to one of the display screen (1) and the fastening piece (5), and the other end of the rotating block (6) is rotatably connected to the other of the display screen (1) and the fastening piece (5);

wherein the mainboard (4) comprises a first connecting plate (10), a second connecting plate (11) and an elastic damping device;

sliders (12) are arranged on the first connecting plate (10), slideways (13) are arranged on the second connecting plate (11), and the sliders (12) are movably clamped in the slideways (13);

the elastic damping device comprises first springs (14) and damping blocks (15), the damping blocks (15) are fixedly connected to ends of the first springs (14) and slidably connected to the sliders (12);

the number of the slideways (13) is at least two, first holes (16) are formed in the slideways (13), and the first springs (14) are arranged in the first holes (16);

a damping piece (17) is fixedly arranged on side walls of the slideways (13), and the damping piece (17) is slidably connected to the sliders (12).

11. The rotatable-screen splitter according to claim 10, wherein the mainboard (4) comprises a support plate (18), a second groove (19) is formed in a back side, corresponding to the support plate (18), of the mainboard (4), and the support plate (18) is rotatably fixed in the second groove (19).

12. The rotatable-screen splitter according to claim 11, wherein a first magnetic substance (20) is arranged on the rotating block (6) or the support plate (18);

a third groove (23) is formed in a front side of the mainboard (4), and a third magnetic substance (24) is arranged in the third groove (23) or on a protrusion (21).

13. The rotatable-screen splitter according to claim 10, wherein at least two said display screens (1) are arranged, protrusions (21) are arranged on back sides of the display screens (1), second magnetic substances (22) are arranged on front sides of the display screens (1), and the second magnetic substances (22) at corresponding positions of the display screens (1) have opposite magnetic polarities or have only one magnetic polarity;

third grooves (23) are formed in a front side of the mainboard (4), and the protrusions (21) are movably clamped in the third grooves (23).

14. The rotatable-screen splitter according to claim 10, wherein a speaker, a three-way toggle switch and three TYPE-C interfaces are arranged on the display screen (1).

15. The rotatable-screen splitter according to claim 10, wherein a first limiting block (25) is arranged on the rotating block (6), the rotating block (6) is clamped on the first limiting block (25), and the first limiting block (25) is fixedly connected to the cross arm (3).

16. The rotatable-screen splitter according to claim 10, wherein the cross arm (3) comprises a first connecting arm (28) and a second connecting arm (29);

the connecting portion (2) is connected to the first connecting arm (28), the first connecting arm (28) is movably connected to the second connecting arm (29), and the second connecting arm (29) is connected to the mainboard (4);

at least one fourth groove (30) is formed in the first connecting arm (28).

\* \* \* \* \*